INVENTORS
PHILIP SPERGEL
DONALD A. GORDON
BY Morse + Altman
ATTORNEYS

March 7, 1967  P. SPERGEL ETAL  3,308,438
AUTOFLUOROSCOPE

Filed Nov. 1, 1963  5 Sheets-Sheet 2

INVENTORS
PHILIP SPERGEL
DONALD A. GORDON
BY Morse & Altman
ATTORNEYS

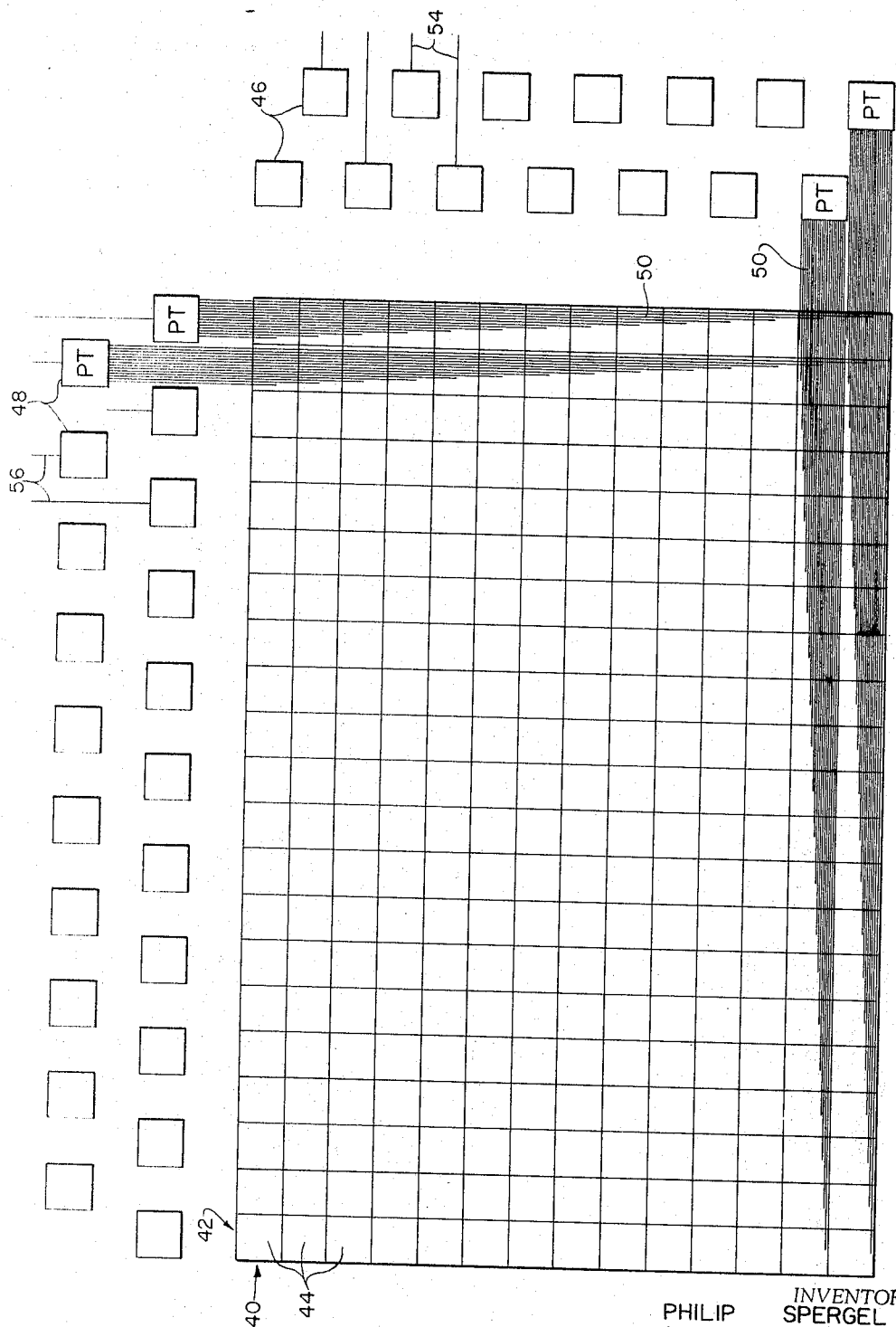

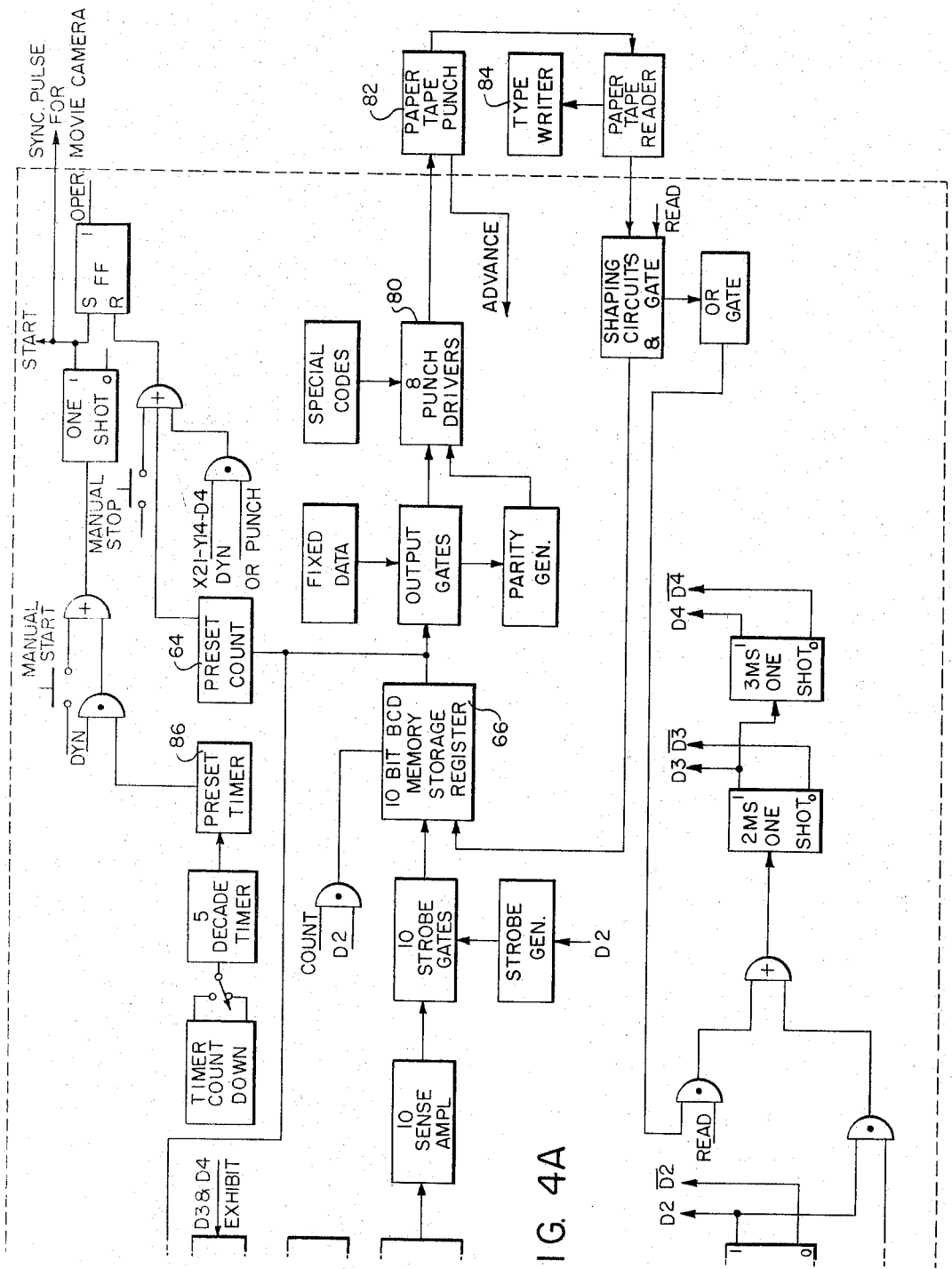

United States Patent Office 3,308,438
Patented Mar. 7, 1967

3,308,438
AUTOFLUOROSCOPE
Philip Spergel, Lexington, and Donald A. Gordon, Cambridge, Mass., assignors to Baird-Atomic, Inc., Cambridge, Mass., a corporation of Massachusetts
Filed Nov. 1, 1963, Ser. No. 320,709
11 Claims. (Cl. 340—172.5)

This invention relates generally to systems for use in the medical diagnosis of body conditions by monitoring the distribution of radioactive material injected in diagnostic amounts into the body. More particularly this invention is directed towards a new and improved autofluoroscope in which radiation emitted from the subject is detected by an array of sensing devices with the positional signals therefrom being converted into digital form for a storage memory which receives and stores digital information for delivery in analog form to a visual display unit.

Various systems have been developed heretofore for the purpose of determining the relative concentrations of a radioactive isotope injected into a living body but these have not proven to be entirely satisfactory for various reasons. For example, prior systems have not been particularly sensitive to low level radioactive events and generally provide a limited amount of information with respect to those events that are detected. Furthermore, prior systems do not provide any significant flexibility with respect to information obtained by detection of radioactive events observed in the body and do not provide a high degree of precision in locating events.

Accordingly, it is an object of the present invention to provide improvements in systems for detecting radioactive disintegrations, particularly those taking place within a living body.

Another object of this invention is to provide a radioactive detection system employing digital techniques.

Still another object of this invention is to provide an autofluoroscope having a digital memory for the storage of digitally encoded information relative to the positions and concentrations of detected radioactive events.

A still further object of this invention is to provide a flexible system for detecting radioactive disintegrations and one which will provide rapid and accurate information with respect to the recorded events.

More particularly this invention features a radiation monitoring system in which an array of radiation sensors is disposed in proximity to the monitored source and, in conjunction with light sensing devices and a digital coding system, is adapted to provide digital information with respect to the position and intensity of a radioactive event. This invention also features a digital memory system for the storage of encoded information received from the detector-encoder portion of the system.

As another feature of this invention, a novel optical system is provided for use in obtaining precise information relative to the location and intensity of disintegration events taking place within a monitored body. As a still further feature of this invention means are provided for cross-correlating stored information to provide an effective reduction of statistical fluctuations and thus render the stored information more easily interpreted.

As a still further feature of this invention means are provided for displaying radioactive disintegrations visually on the face of a cathode ray tube.

But these and other features of the invention, along with further objects and advantages thereof, will become more readily apparent from the following detailed description of a preferred embodiment of the invention, with reference being made to the accompanying drawings in which:

FIG. 3 is a plan view, somewhat schematic, of the array of detecting elements, FIGS. 4 and 4A are schematic diagrams, partially in block form, illustrating the entire system in detail, and, FIG. 5 is a diagram of the cross-correlation portion of the system.

In general, the invention may be characterized as an autofluoroscope which is essentially an imaging system providing a pictorial display of the relative concentrations of a radioactive isotope within a section of a structure containing an unknown distribution of activity. Specific applications of the invention would be the visualization of body structures, organs and defects in subjects undergoing a diagnosis following administration of a diagnostic amount of radioactive material.

Figure 1:
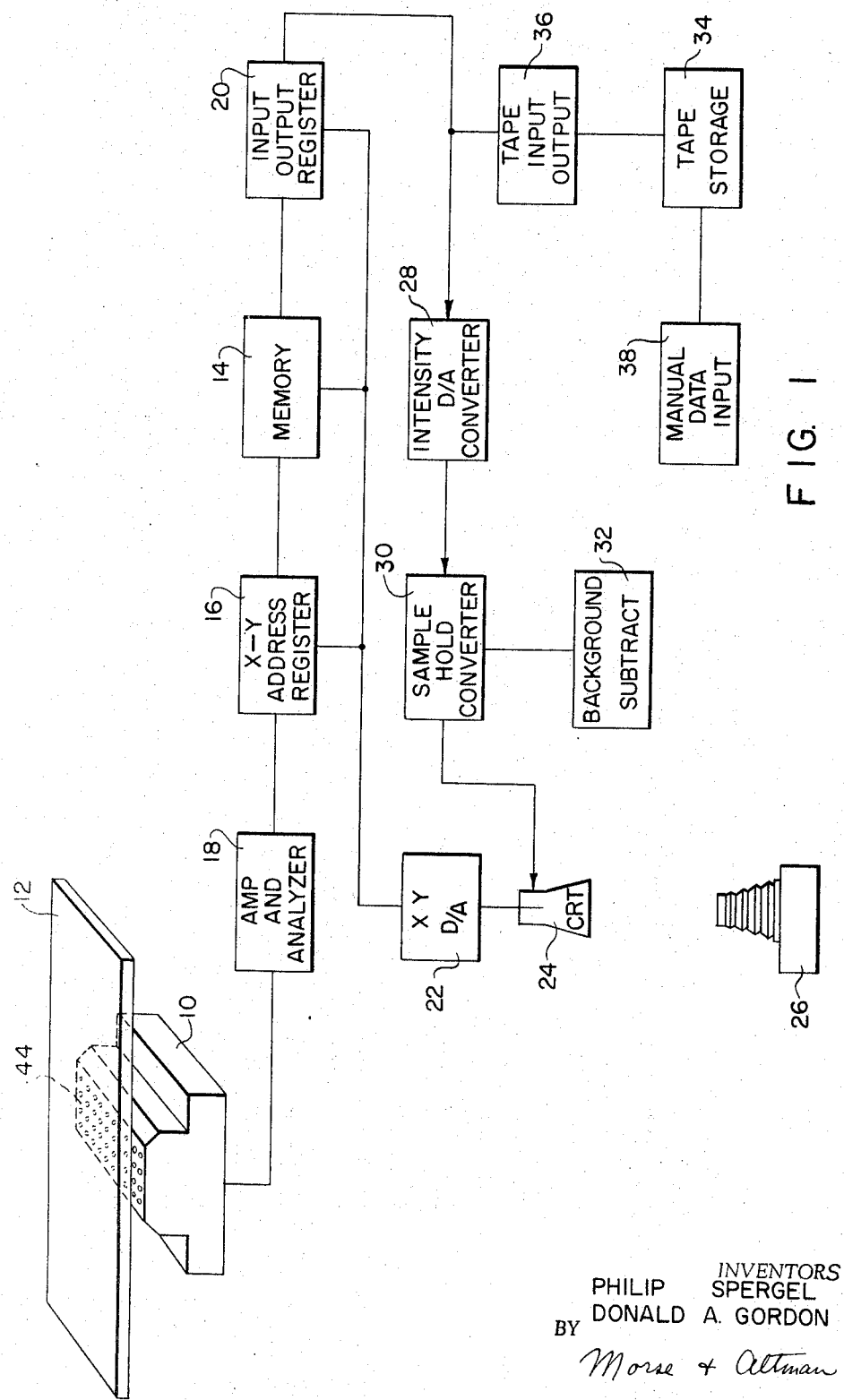
FIG. 1 is a schematic diagram showing the system in generally block form.

As shown in FIG. 1 the autofluoroscope generally comprises a collimated detector assembly which is sensitive to the radiation from a subject reclining on a horizontal transparent platform 12 disposed over the detector unit 10. Individual scintillation events in the detector 10 are sensed and the coordinate position of each is digitized and fed into a coincident current core memory 14 by means of an X-Y coordinate address register 16. An amplifier and pulse height analyzing unit 18 is interposed between the detector 10 and the register 16 to amplify the output of the detector and to provide discrimination against noise and events of energy other than that being used.

The memory or storage system 14 stores all acceptable data obtained by the detector 10 and passed through the amplifier analyzing unit 18. Each event is addressed into the storage and accumulated to previous events having the same address. Thus, the number stored at a given address represents the number of recorded disintegrations having originated within the monitored subject at a point, the location of which corresponds to the address. An input output register 20 feeds information stored in the memory 14 into a digital-to-analog converter 28 which supplies analog signals to a cathode ray tube 24 for displaying the accumulated data periodically during data accumulation. The analog data representing the X-Y positions of the accumulated data is obtained through the X-Y address register 16 and the X-Y digital-analog converter 22. Following accumulation of sufficient data, the cathode ray tube presentation may be photographed by a camera 26 to provide a permanent pictorial record. Preferably a Polaroid type camera 26 is employed and the photographic record will constitute a pictorial two-dimensional display of the relative distribution of radioactive material within the volume being examined, a section of higher activity being represented as an area of greater density and a relatively inactive section as an area of lesser density. A movie type camera can also be used to record rapid changes in the display. A digital-to-analog converter 28 operates on the output of the memory input-output register 20 and supplies the stored data to a sample, hold and correlate subsystem 30 which performs cross-correlation on the supply data and which supplies analog signals to the cathode ray tube 24. A background subtract system 32 is available to provide for controllable degrees of contrast enhancement and data reduction in order to facilitate clinical interpretation and evaluation of the record.

A tape memory unit 34, controlled by a tape input-output register 36, is provided as a means of obtaining a permanent record of the display for subsequent representation on the display unit. A manual data input 38 may also be employed for logging any pertinent data for reference on the tape.

Figure 2:
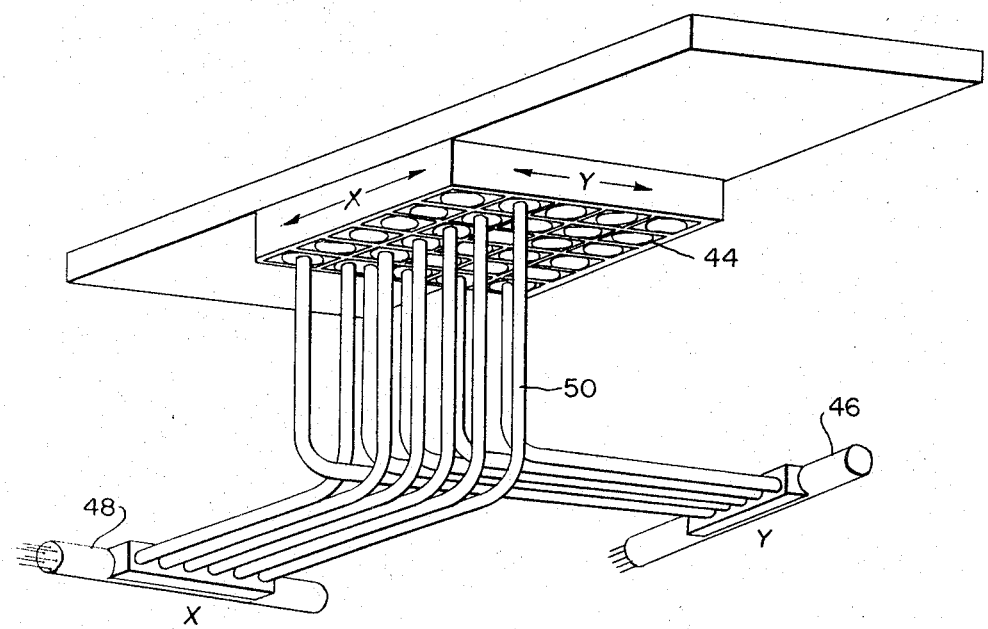
FIG. 2 is a view in perspective showing a portion of the electro-optical part of the detecting system.

Referring now more particularly to FIGS. 2 and 3 of the drawings, the detector-encoder 10 will be described in detail. The detector is an electro-optical system comprising an array of individual radioactive sensitive elements 44 typically distributed in columns 40 of 21 elements and in rows 42 of 14 elements. It will be understood that the occurence of a scintillation event in any one element is sensed and its coordinate position digitally encoded and fed into the memory. The number of events that occur in each element are counted and stored in a corresponding location in the 294 word coincident current core memory 14 referred to generally in connection with FIG. 1. As the events occur the memory contents are displayed in analog fashion on the face of the cathode ray tube 24 with a spot appearing in the same relative location as the element 44 in which the scintillation occurred. The intensity of the spot is proportional to the number of counts accumulated up to the time of the event.

Each detecting element 44 typically is a scintillator in the form of a thallium-activated sodium iodide crystal having the form of a thin disc, for example. Optically coupled to the array of scintillator crystals are photomultiplying devices 46 and 48, with a separate photodetector 46 for each column 40 and a separate photodetector 48 for each row 42 of detecting elements 44. As shown, each photodetecting device is optically coupled to its associated detecting elements by means of light pipes 50, typically fabricated from lengths of Lucite or other suitable material. As best shown in FIG. 3, each photomultiplying device connects to a number of light pipes 50, with each pipe being connected to a single detecting element in a row or column. It will thus be understood that any event sensed by a detecting element 44 will produce an output signal and this signal will be multiplied by the photomultiplying devices 46 and 48. However, these photomultiplying devices, by reason of their optical coupling, will also provide information as to the coordinate position of the event. Any detecting device within the array will cause a response in only one unique pair of photomultiplying tubes 46 and 48 with the result that the arrangement of detecting elements, light pipes and photomultiplying tubes provides a technique for obtaining digital information from the crystal array. Therefore, the unique pair of photomultiplier tubes provide the X and Y coordinate signal data.

The optical system may also be organized to obtain the digital coordinate information in a binary coded format. Each detecting element 44 has connected to it adequate numbers of light pipes 50 to provide a coded signal. The system is one of piping light from the crystal array to obtain binary combinations. The binary light combinations are detected and an output code is developed to drive the X–Y address register 16.

To better understand the technique by which binary digital information is obtained from the array of crystal detectors, assume that each box (identified by Roman numerals) below corresponds to a radiation detector with X and Y providing coordinate symbols.

|   | $X_1$ | $X_2$ | $X_3$ | $X_4$ |
|---|---|---|---|---|
| $Y_1$ | I | II | III | IV |
| $Y_2$ | V | VI | VII | VIII |

With the letters $a$, $b$, $c$ and $d$ representing photomultiplying tubes or other light detectors, light may be piped from the scintillators, as identified by their coordinate positions to the light detectors in the following combinations:

$(X_1Y_1, X_1Y_2, X_2Y_1, X_2Y_2, X_3Y_1, X_3Y_2, X_4Y_1, X_4Y_2)$ to $a$
$(X_1Y_1, X_1Y_2, X_2Y_1, X_2Y_2)$ to $b$
$(X_1Y_1, X_1Y_2, X_3Y_1, X_3Y_2)$ to $c$
$(X_1Y_1, X_2Y_1, X_3Y_1, X_4Y_1)$ to $d$

Figure 4:
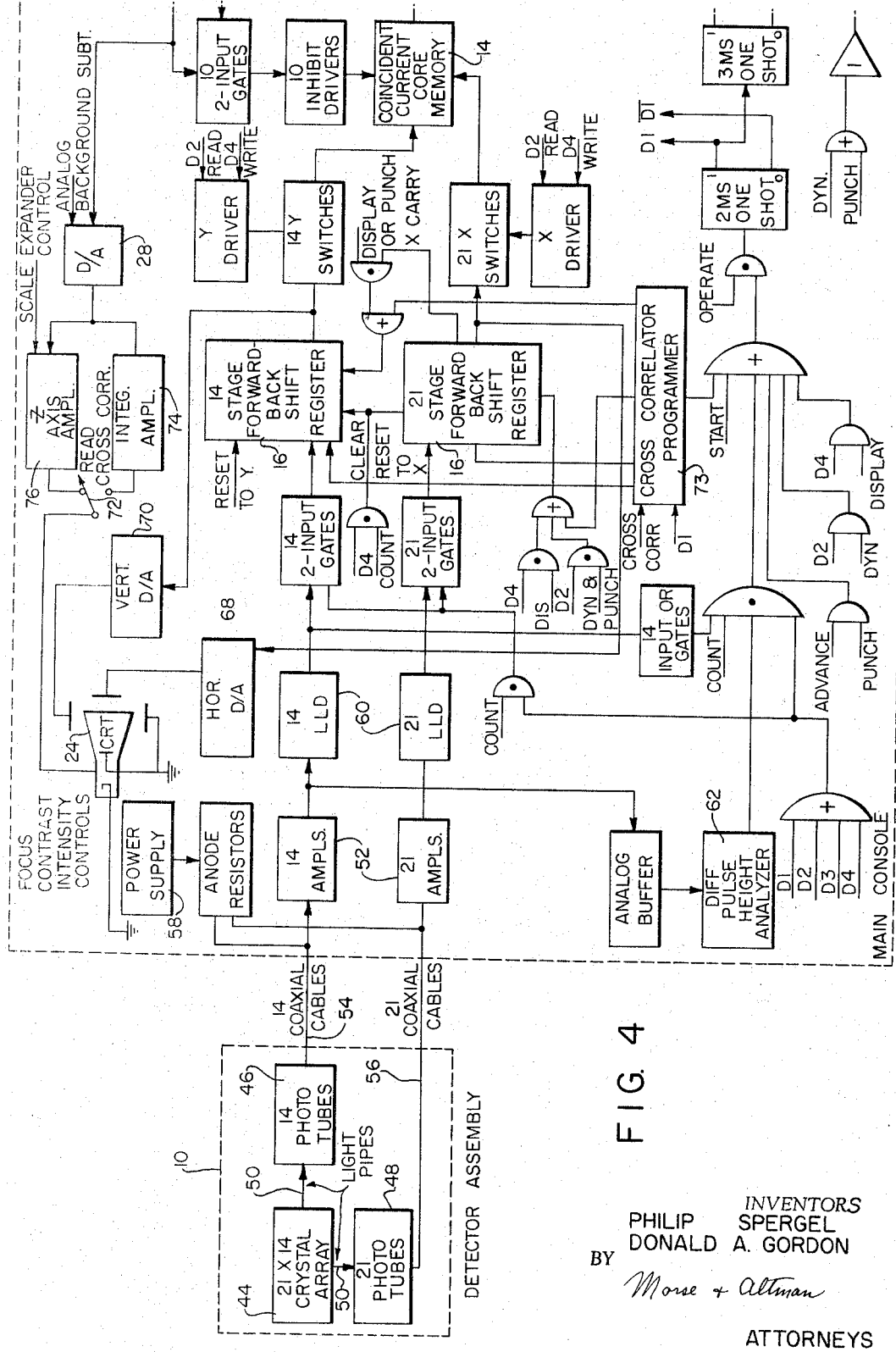

Thus the following code may be obtained:

I = $abdc$          V = $abc\bar{d}$
II = $ab\bar{c}d$   VI = $ab\bar{c}\bar{d}$
III = $a\bar{b}cd$  VII = $a\bar{b}c\bar{d}$
IV = $a\bar{b}\bar{c}d$  VIII = $a\bar{b}\bar{c}\bar{d}$ Referring now more particularly to FIG. 4, the system which has six modes of operation ("count," "display," "cross-correlate," "dynamic," "punch," and "read") will be described in detail. The photomultiplying tubes 46 and 48 which form part of the detector assembly connect to the current inputs of 35 amplifiers 52 by means of coaxial cables 54 and 56. These cables connect directly to the phototube anodes and, in addition to the signal input, also carry voltage power from a power supply 58.

Each amplifier 52 drives a low level discriminator 60 set just above the system noise level. In the "count" mode of operation, whenever a pulse appears at the output of one of the 14 row or Y discriminators and the 21 column or X discrimination and its amplitude is within the window set upon a pulse height analyzer 62, it triggers a one shot starting a memory read-write cycle. The X and Y discriminator pulses jam set the two memory address shift registers 16 to the address corresponding to the detecting element 44 in which the event occurred. The contents of the memory 14 at this location are read out, increased by one and stored back in the memory. There is ten bits of storage capacity at each memory address. Since the data is handled in binary coded decimal fashion, this allows a maximum of 399 counts to be stored at any location. A preset count device 64 is provided to stop the accumulation of counts at the time at which the number of counts in any memory position reaches a number preset on a thumb wheel switch. Each time an event occurs and the corresponding memory location is read out into a ten bit storage register 66, the accumulated data is also displayed on the cathode ray tube 24. The 21-stage X memory register 16 is converted by means of a digital-to-analog converter 68 to a voltage level proportional to the X position selected. It will be understood that the output of the converter 68 drives the horizontal plates of the cathode ray tube 24. In like manner the 14-stage Y memory address register 16 is converted by means of a digital-to-analog converter 70 to a voltage to drive the vertical plates. The output of the memory register 66 is converted to a proportional voltage by means of the digital-to-analog converter 28 to vary the Z axis or intensity of the spot as a function of the accumulated counts.

When the system is in the "display" mode of operation, no further counts are allowed to be accumulated. The complete memory is sequentially addressed periodically, 16 times per second, for example, and displayed on the cathode ray tube 24. Persistence of vision allows a constant pattern to be observed. Focus, intensity and contrast controls are provided for picture adjustment.

With the system in the "display" mode, a cross-correlation switch 72 allows signal enhancement by an averaging technique. In this mode, instead of displaying the stored contents of the memory as it exists by sequentially addressing and displaying, a special sub-routine is employed. The contents of nine memory locations, arranged in a 3 by 3 square pattern, are read out, averaged and displayed as the cross-correlated output of the center address of the pattern. The entire memory is read out and displayed in this fashion except for the outer rows and columns. These fringe locations will not be addressed and will remain dark. All other locations will display the averaged output of the nine cores in its square array, thereby tending to reduce the effects of statistical inaccuracies caused by low accumulated counts.

Figure 5:
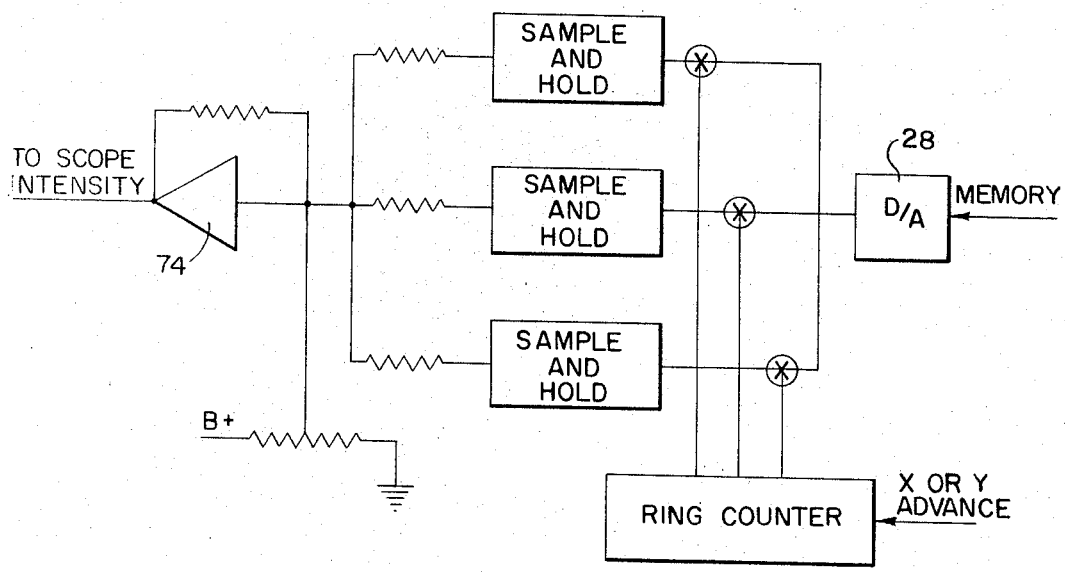

The addressing of the memory address registers in the "cross-correlation" mode and is handled by a nine step programmer. There are four lines coming from a programmer 73 to advance the address registers. The cross-correlation feature requires that the memory address registers be of the forward-backward type. The programmer supplies the X shift forward, the X shift backward, the Y shift forward and the Y shift backward pulse trains needed to address the memory properly. The contents of the memory storage register is converted to a current proportional to its digital contents each time the memory is addressed in the nine-step program. The current is summed in an integrating amplifier 74 which drives the intensity control when the ninth step in each program is reached. A bias control is included on the digital-to-analog converter 28 between the memory storage register 66 and a Z axis amplifier 76 to allow analog background subtraction. A scale expander is included on the Z axis amplifier 76 to allow amplication of that portion of the output of the digital-to-analog converter 28 which is above the background level. In FIG. 5 there is illustrated in somewhat greater detail an analog cross-correlator where the output of the memory is converted into an analog voltage and sequenced sample hold circuits 78 are summed for display on the cathode ray tube 24.

Once the data has been accumulated and stored in the memory 14, it may be stored on paper tape for a permanent record. In the "punch" mode, the memory is sequentially addressed destructively. The output of the memory storage register 66 is strobed to drive punch drivers 80. A standard IBM BCD eight column punch code may be employed. Header data for each record may contain alphanumerical codes for the patient's name and the date. This fixed data is set up by means of front panel switches, for example.

In practice, each memory location will occupy three characters on the tape. A punch 82 typically operates at about 50 characters per second. Therefore, a complete memory punchout will normally require about 18 seconds. Included in these records may be special codes such as carriage return to allow direct reading of the tape by a typewriter 84.

When the system is in the "dynamic" mode of operation, the memory alternately accumulates data for a short period, then is destructively read out and displayed. The readout time typically will take about three milli-seconds. The accumulation time is variable in this mode, being preset by a preset timer 86 having appropriate thumb wheel switches. The shortest accumulation display cycle typically is 16 cycles per second to allow synchronization with a movie camera which may be employed to photograph the face of the cathode ray tube 24 for a permanent record.

The system illustrated and described herein provides greater sensitivity and accuracy in monitoring radioactive disintegrations than any similar system previously available. In addition, the system is extremely flexible providing a number of different modes of operation whereby a visual presentation may be provided currently with the operation of the detector. Also a permanent record may be made of the display with photographic equipment or the information may be reduced to a paper tape which may subsequently be read back into the autofluoroscope at any desired time and the information restored into the memory. The data may then be displayed on the cathode ray tube for observation. In addition, as an off-line operation, the paper tape may be read by a tape reader to drive a typewriter to give a printout of the data in digital form. The typed data will be in the same relative form as the crystal bank allowing contour lines connecting locations of similar counts to be made. In this manner, a completely objective map of the concentration of radioisotope in the organ in question may be obtained.

The autofluoroscope may also be employed for dynamic studies. The events are accumulated for a short period of time and then destructively read out of the memory and displayed on the cathode ray tube at selected rates. The system has numerous advantages such that an immediate and accurate presentation of the monitored subject may be observed in detail as the actual events occur or the system may be employed to provide permanent records for subsequent study as desired.

While the invention has been described with particular reference to the illustrated embodiment, it will be understood that numerous modifications thereto will appear to those skilled in the art. For example, various types of radioactive sensing devices may be employed in the sensing array. Also various types of light detecting devices may be employed in place of the photomultiplying tubes illustrated. Accordingly, the above description and accompanying drawings should be taken as illustrative of the invention and not in a limiting sense.

Having thus described the invention, what we claim and desire to obtain by Letters Patent of the United States is:

1. A radiation monitoring system, comprising a plurality of radiation sensing devices arranged coordinately in generally co-planar relationship, a plurality of photo-detecting means associated with said devices, light conducting means optically coupling each of said devices to a unique combination of said photo-detecting means, the output of said photo-detecting means providing digital information relative to the coordinate position of a monitored radiation event, memory means for receiving and storing said digital information, and readout means for delivering in visible form the information accumulated in said memory means.

2. A radiation monitoring system according to claim 1 wherein said readout means is a cathode ray tube.

3. A radiation monitoring system according to claim 2 including digital-to-analog converting means connected with said memory means and said cathode ray tube for providing positional and intensity control of said tube.

4. A radiation monitoring system according to claim 3 including cross-correlation means for averaging the output of said memory means.

5. A radiation monitoring system according to claim 1 wherein said memory means is in the form of a coincident current core memory.

6. A radiation monitoring system according to claim 1 wherein said radiation sensing devices are scintillators and said light conducting means are light pipes.

7. A radiation monitoring system, comprising a plurality of individual scintillators arranged in intersecting rows and columns, a photomultiplying device associated with each of said rows and columns, light conducting means optically coupling each of said scintillators to a unique pair of said photo-multiplying devices, the out of said photo-multiplying devices providing digital information relative to the position of a monitored radiation event, memory means for receiving, storing and delivering said digital information, a cathode ray tube for visually displaying information accumulated in said memory means and digital-to-analog converting means whereby the digital output of said memory means provides analog control over said cathode ray tube.

8. A radiation monitoring system, comprising a plurality of individual radiation sensors arranged in intersecting rows and columns and adapted to produce a light signal in response to a detected radiation event, a photo-multiplying device associated with each of said rows and columns, light conducting means optically coupling each of said sensors to a unique pair of said photo-multiplying devices, the output of said photo-multiplying devices providing digital information relative to the coordinate position of a monitored radiation event, coincident current core memory means for receiving, storing and delivering said digital information, a cathode ray tube for visually displaying information accumulated in said memory means and digital-to-analog converting means whereby the digital output of said memory means provides analog control over said cathode ray tube.

9. A radiation monitoring system, comprising a plurality of individual scintillators arranged in intersecting rows and columns, a photomultiplying device associated with each of said rows and columns, light conducting pipes optically coupling each of said scintillators to a unique pair of said photomultiplying devices, the output of said photomultiplying devices providing digital information relative to the position of a monitored radiation event, coincident current core memory means for receiving and storing said digital information, a cathode ray tube for visually displaying information accumulated in said memory means, digital-to-analog converting means whereby the digital output of said memory means provides positional control over said cathode ray tube, a memory storage register associated with said memory means for storing repetitive events and digital-to-analog converting means connecting said memory storage register to said cathode ray tube whereby the digital output of said memory storage register provides intensity control over said cathode ray tube.

10. A radiation monitoring system according to claim 9 including tape recording means and tape reading means connected to said memory means and said memory storage register for recording the digital information relative to the position and intensity of the monitored event for subsequent display on said cathode ray tube.

11. A radiation monitoring system, comprising radiation sensing means defining an array of individual sensing zones, a plurality of photomultiplying devices, light conducting means optically coupling each of said zones to a unique combination of said photomultiplying devices, the output of said photomultiplying devices providing binary coded signals relative to the position of a monitored radiation event, memory means for receiving storing and delivering said digital information, a cathode ray tube for visually displaying information accumulated in said memory means and digital to analog converting means whereby the digital output of said memory means provides analog control over said cathode ray tube.

No references cited.

ROBERT C. BAILEY, *Primary Examiner.*

M. LISS, *Assistant Examiner.*